Patented Oct. 10, 1950

2,525,518

UNITED STATES PATENT OFFICE 2,525,518

PRODUCTION OF DIMETHYLAMINOANTI-PYRINES

Maurice Ernest Bouvier, St.-Didier au Mont d'Or, France, assignor to Société des Usines Chimiques Rhone-Poulenc, Paris, France No Drawing. Original application May 15, 1946, Serial No. 670,042. Divided and this application September 30, 1947, Serial No. 777,125. In France January 18, 1944

Section 1, Public Law 690, August 8, 1946
Patent expires January 18, 1964

5 Claims. (Cl. 260—310)

This application is divided from application Serial No. 670,042 filed May 15, 1946, now U. S. Patent 2,499,265.

This invention is for improvements in or relating to the production of pyrazolone derivatives and, in particular, concerns the preparation of 1-phenyl-2:3-dimethyl-4-dimethylaminopyrazolone, also known under the name "pyramidone," from a new intermediate, the corresponding 4-methyleneamino compound.

The preparation of pyramidone (1-phenyl-2:3-dimethyl-4-dimethylaminopyrazolone or dimethylamino antipyrine) has heretofore usually been effected by the dimethylation of aminoantipyrine, employed either in the pure state or without isolation from the medium in which it is formed. If it was necessary to isolate the aminoantipyrine, which is very soluble in water, the process has become complicated. If the aminoantipyrine was dimethylated directly in the solution in which it was prepared, then most of the impurities which accompanied it were retained by the pyramidone in addition to those which were formed during the methylation; moreover, the aminonantipyrine solution was often so dilute that dimethylation was difficult.

As a result of research and experimentation, it has now been found that it is possible to separate the aminoantipyrine in an insoluble form from the medium in which it has been prepared by combining it with an equimolecular amount of formaldehyde. The compound thus formed, which has not hitherto been described, has the great advantage that it can readily be transformed into pyramidone by concomitant or successive reduction and methylation.

The formaldehyde combines with aminoantipyrine with elimination of one molecule of water according to the equation:

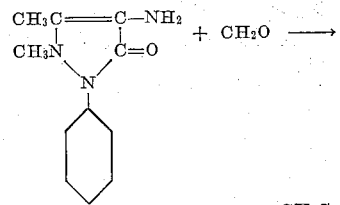

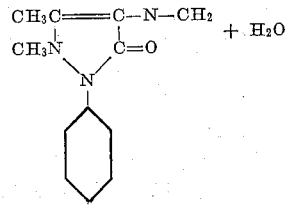

For convenience, the product is described hereinafter as methylene-aminoantipyrine.

When an aqueous solution of aminoantipyrine is treated with a molecular proportion of formaldehyde (in the form of the ordinary aqueous solution) the mixture, which is at first clear, becomes more and more turbid and a thick, viscous, sticky oil separates. This oil is slightly soluble in water and in alkali, but is soluble in dilute acids, alcohols or other solvents. This oil, which is probably methylene-aminoantipyrine in its monomeric form, polymerises more or less rapidly to a solid product soluble in acids but insoluble in water and sparingly soluble in the majority of organic solvents in the cold. It melts at approximately 169–172° C.

The methyleneaminoantipyrine can therefore be separated either in the form of an oil or in the form of a solid. It is difficult to effect separation in the form of an oil because the latter is sticky and viscous. However, for separation, use can be made of the substance's property of being stable in the presence of alkalies and of dissolving readily in benzene and other organic solvents. The methyleneaminoantipyrine is more soluble in benzene, than is, for example, aminoantipyrine but since it is less soluble in water, it can readily be separated in the form of a solution in benzene. If the benzene solution is evaporated rapidly in vacuo the methyleneaminoantipyrine is obtained in the form of the oil. On the other hand, if the solution is boiled for some time then there is precipitated a solid product (polymer), melting at 169–172° C. On keeping it in the cold for some time it again deposits in a solid form.

It has been found that this polymerisation is considerably accelerated when the monomer is stirred in the presence of water and benzene (or some other solvent of the monomer which is also immiscible with water). Hence, if an aqueous solution of formaldehyde is run into an aqueous solution of aminoantipyrine and stirred with benzene (or with toluene, etc.), it soon forms a cream which becomes completely homogeneous. On removal of the benzene or its equivalent, either by distillation or by evaporation in a current of gas, there is formed an aqueous suspension of polymerized methyleneaminoantipyrine, which can be filtered.

The monomeric methyleneaminoantipyrine, which is slightly soluble in water, is soluble in alcohols (methyl, ethyl, etc.) and equally soluble in presence of a molecule of aqueous formaldehyde solution. The methylene-aminoantipyrine of M. P. 169–172° C., is insoluble in water, very slightly soluble in most organic solvents in the cold, especially in alcohols, but in the presence of a molecular proportion of formaldehyde it becomes soluble, especially at high temperatures, and it is then not reprecipitated on cooling.

Methyleneaminoantipyrine, polymerised or not, can readily be reduced by known methods of hydrogenation to mono - methylaminoantipyrine when it is treated, for example, either with an acid and a reducing metal (such as zinc and hydrochloric acid), or with formic acid under heat, or with hydrogen in the presence of a metal hydrogenation catalyst (nickel, platinum or palladium).

Mono-methylaminoantipyrine can in its turn be methylated to dimethylaminoantipyrine (pyramidone) either by means of a methyl halide or of dimethyl sulphate or, again, of formaldehyde in presence of a reducing agent (zinc and hydrochloric acid, formic acid, or hydrogen and a catalyst).

Methyleneaminoantipyrine, polymerised or not, can be converted directly into dimethylaminoantipyrine (pyramidone), without isolating the monomethyl derivative, by treatment with a molecular proportion of formaldehyde in the presence of a reducing agent (metal plus an acid, or formic acid or hydrogen in the presence of a catalyst such, for example, as platinum, palladium or nickel).

Examples illustrating the preparation of the methyleneaminoantipyrine are set out in detail in application Serial No. 670,042 from which the present application is divided.

The present invention is illustrated by the following, non-limitative examples in which the parts stated are parts by weight. These illustrate the preparation of pyramidone from the methyleneaminoantipyrine by two different methods viz: firstly, hydrogenation to mono-methylaminoantipyrine, which in turn is methylated by known method, and secondly by direct conversion to dimethylaminoantipyrine.

*Example I*

Into a hydrogenation apparatus is charged a solution containing 215 parts of methyleneaminoantipyrine, either polymerised or not, 500 parts of ordinary alcohol, and 100 parts of a 30% (by weight) formaldehyde solution. On warming to 50° C. a clear solution is obtained, which does not deposit a precipitate on cooling. Active nickel is added, air in the apparatus is replaced by hydrogen and stirring is begun; hydrogen absorption is rapid and takes place in the cold and at atmospheric pressure. Hydrogenation can be effected at elevated temperature and under pressure if desired. At atmospheric pressure and a temperature of 20–30° C. with rapid stirring, theoretical absorption of hydrogen is achieved, the time required varying from 30 minutes to 2 hours, according to the method of stirring and the amount of nickel used. The catalyst is then separated from the alcoholic solution of pyramidone. The solution is concentrated and allowed to crystallise. 225–230 parts of pyramidone are recovered therefrom, melting at 106–107° C.; the yield is quantitative.

*Example II*

215 parts of methyleneaminoantipyrine are dissolved in a mixture of ice and hydrochloric acid (300 parts of ice to approximately 800 parts of 30% hydrochloric acid) 100 parts of 30% formaldehyde are added. The mixture is stirred and 200 parts of zinc dust 75% (or the corresponding amount if the titre is different) are added gradually, the temperature being maintained just below 25° C. The mixture is then raised to 70° C. to complete the solution of the zinc, after which the mixture is neutralised and the pyramidone is extracted by known methods. The yield is excellent, approximating to the theoretical.

The experimental conditions hereinbefore described can be varied between wide limits. There can be employed, for example, a different reducing metal in place of zinc (for example aluminum) and an acid other than hydrochloric, for example sulphuric acid.

*Example III*

In carrying out the reduction when using formic acid as the reducing agent in accordance with the following equation;

$$RN=CH_2+CH_2O+2HCOOH \rightarrow RN(CH_3)_2+2CO_2+H_2O$$

the operation can be carried out in the cold, at elevated temperature however, the reaction proceeds more rapidly. In the foregoing equation $R$ represents the pyrazolone residue.

215 parts of methyleneaminoantipyrine are dissolved in 200 parts of water containing 46 parts of formic acid. This solution is poured gradually into 110 parts of 30% formaldehyde, 50 parts of water, and 50 parts of formic acid, the temperature being maintained at 85–95° C. The amount of carbon dioxide which is evolved affords means of following the progress of the reaction. When the reaction is completed, the whole is made alkaline and the pyramidone, which is formed in very good yield, is extracted by known methods.

In the following claims it is to be understood that the expression "4 - methyleneaminoantipyrine" includes both the monomeric and the polymeric forms of that compound.

I claim:

1. A process for the preparation of 1-phenyl-2:3-dimethyl-4-dimethylaminopyrazolone which comprises reduction and methylation of 1-phenyl - 2:3 - dimethyl - 4 - methyleneaminopyrazolone.

2. A process for the preparation of 1-phenyl-2:3-dimethyl-4-dimethylaminopyrazolone which comprises mixing 4-methyleneaminoantipyrine with a molecular proportion of formaldehyde in the presence of a reducing agent.

3. A process for the preparation of 1-phenyl-2:3-dimethyl-4-dimethylaminopyrazolone which comprises mixing 4-methyleneaminoantipyrine with a molecular proportion of formaldehyde in the presence of a metal and an acid.

4. A process for the preparation of 1-phenyl-2:3-dimethyl-4-dimethylaminopyrazolone which comprises mixing 4-methyleneaminoantipyrine with a molecular proportion of formaldehyde in the presence of formic acid.

5. A process for the preparation of 1-phenyl-2:3-dimethyl-4-dimethylaminopyrazolone which comprises mixing 4-methyleneaminoantipyrine with a molecular proportion of formaldehyde in the presence of hydrogen and a metal hydrogenation catalyst.

MAURICE ERNEST BOUVIER.

(References on following page)

REFERENCES CITED

The following references are of record in the file of this patent:

UNITED STATES PATENTS

| Number | Name | Date |
|---|---|---|
| 579,412 | Stolz | Mar. 23, 1897 |
| 2,005,506 | Reuter | June 18, 1935 |
| 2,045,588 | Dvornikoff | June 30, 1936 |

FOREIGN PATENTS

| Number | Country | Date |
|---|---|---|
| 913,971 | France | June 11, 1946 |
| 595,703 | Great Britain | Dec. 12, 1947 |